Feb. 18, 1969  D. C. LEONARD ET AL  3,427,892
LARGE DIAMETER CAST SHEAVES
Filed March 2, 1967

INVENTORS.
DANIEL C. LEONARD
F. M. LAMB
BY
AGENT.

INVENTORS.
DANIEL C. LEONARD
F. M. LAMB
BY
AGENT.

United States Patent Office 3,427,892
Patented Feb. 18, 1969

3,427,892
LARGE DIAMETER CAST SHEAVES
Daniel C. Leonard and Fredrick M. Lamb, Orillia, Ontario, Canada, assignors to Dorr-Oliver Incorporated, Stamford, Conn., a corporation of Delaware
Filed Mar. 2, 1967, Ser. No. 621,729
U.S. Cl. 74—230.13
Int. Cl. F16h 55/40
3 Claims

ABSTRACT OF THE DISCLOSURE

The present invention relates to an improved casting and fabrication method for large diameter head sheaves. The rim is cast separately and in relatively small segments and the hub has a clearance to permit easy entry and removal of individually attachable spokes.

---

Industrial requirements for large diameter head sheaves for such uses as excavators, head frames, elevators, ski-tow pulleys and cable towers, etc. have greatly increased as the technology has increased the weight of the object being pulled or carried and the effective length of the cable. In the design and specification of head sheaves having a pitch diameter in excess of eight feet, the basic problem is to find an optimum balance between the total weight of the finished sheave and the technological disadvantages involved in the casting of unusually large size pieces. The weight of the sheave is a factor in determining the size and strength of the bearing and support structure and the amount of power necessary to rotate and brake the sheave. In the majority of applications the object is to make the head sheave as light as possible without sacrificing essential strength. If the diameter is critical and cannot be reduced the only alternative for reducing weight while maintaining an optimum strength is to cast the sheave with as thin a wall section as possible. This, however, only multiplies the inherent disadvantages in the feeding, gating and cooling of inordinately large size castings. Thin walled sections, of themselves, are difficult to feed and gate and when a large thin walled casting is required the problems are only compounded and casting efficiency, i.e., the ratio of sound castings to casting failures, becomes both a major economic factor and a limitation on the diameter of the sheave.

Large diameter head sheaves, because of the friction and strain placed on particular rim sections during startup and braking, have a tendency to wear and fail unevenly. Thus replacement cost becomes another important consideration and limitation on diameter, especially when an entire sheave must be replaced when only a section has failed.

It is, therefore, an object of the present invention to efficiently and inexpensively cast large diameter thin walled head sheaves.

It is another object of the present invention to cast large diameter head sheaves wherein sections, if worn, can be easily and economically replaced.

It is still another object of the present invention to separately cast and fabricate the rim and hub sections of a large diameter head sheave.

It is yet another object of the present invention to provide individually attachable spokes which are separately replaceable on failure.

The subject matter which applicants regard as their invention is particularly pointed out and distinctly claimed in the concluding portion of this specification. The invention, however, as to its organization and method of operation together with further objects and advantages thereof will best be understood by reference to the following description taken in conjunction with the accompanying drawings in which:

Figure 1:
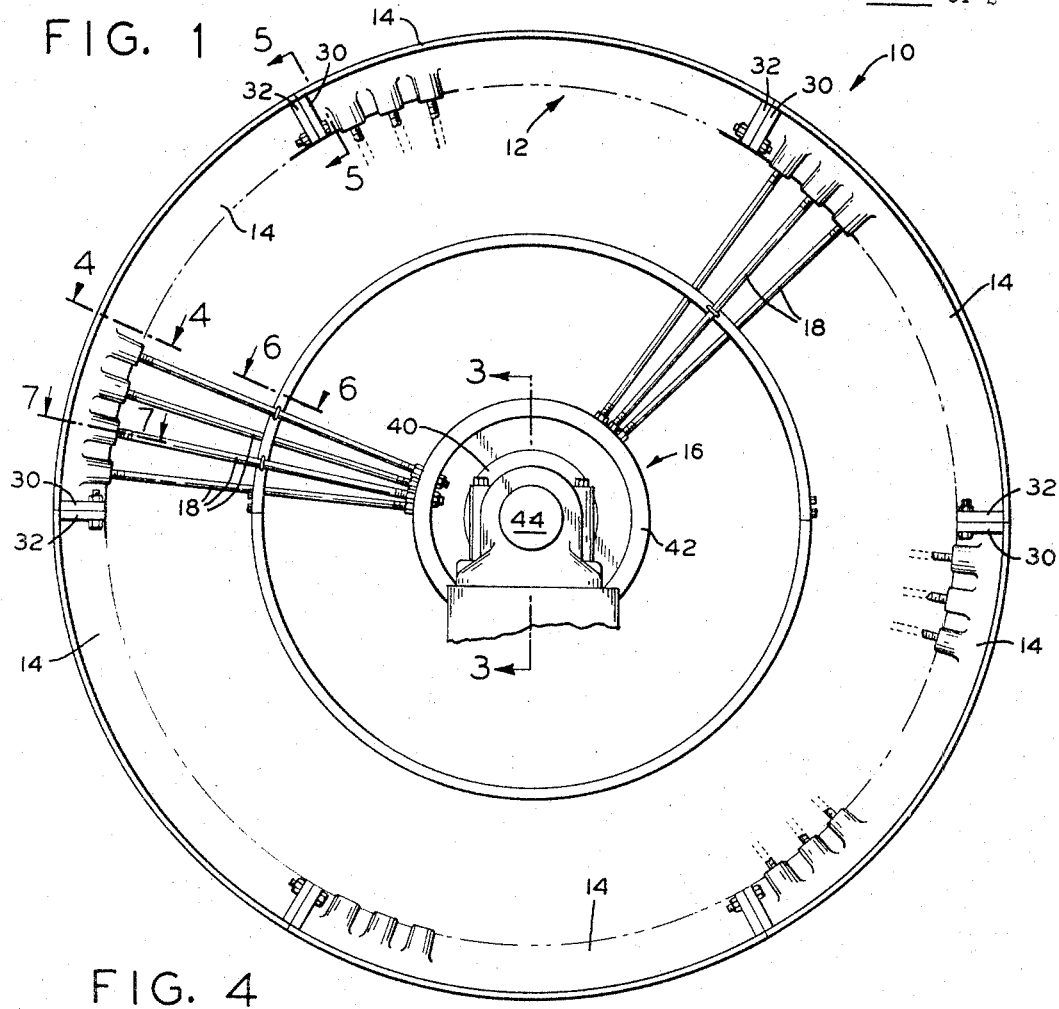
FIGURE 1 is a side elevational view with parts removed for clarity of showing of a head sheave embodying the present invention.

Referring to the drawings a head sheave 10 is shown to illustrate an exemplary application of the present invention. However, it should be understood that the present invention is not limited in its application to the particular head sheave disclosed.

Head sheave 10 is comprised of a rim 12 made up of a series of separately cast sections 14, a hub 16, and a plurality of spokes 18 interconnecting the rim sections and the hub. The rim is cast in relatively small individual sections, shown in this exemplary application to have an arc length of 60°, to alleviate the inherent casting problems in large thin walled members. The optimum arc length for the rim sections can be determined as a function of, among other things, the diameter of the sheave, the casting characteristics of the metal, the weight to strength ratio of the metal and the thickness of the rim wall. Small sections have all the advantages of small castings, i.e., they are easy to feed and gate and will cool uniformly, thus relatively thin walled rims can be fabricated and weight can be significantly reduced without sacrificing essential strength. In addition, casting efficiency is increased because should a casting fail only a section is lost, and not an entire rim or a complete sheave.

Figure 4:
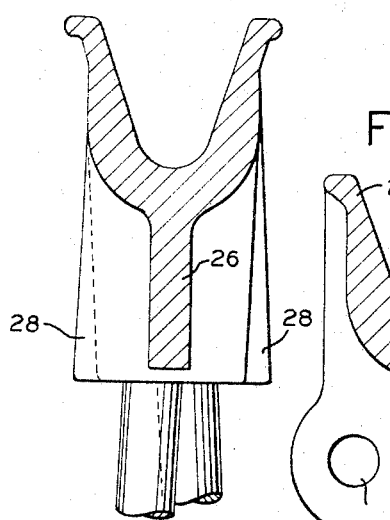
FIGURE 4 is an enlarged view in section of a rim portion of the present invention taken along the line 4—4 of FIGURE 1.
Figure 5:
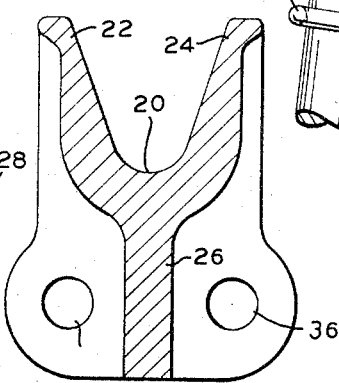
FIGURE 5 is an enlarged view in section of a rim connecting portion of the present invention with the connecting bolts removed for clarity of showing taken along the line 5—5 of FIGURE 1.
Figure 6:
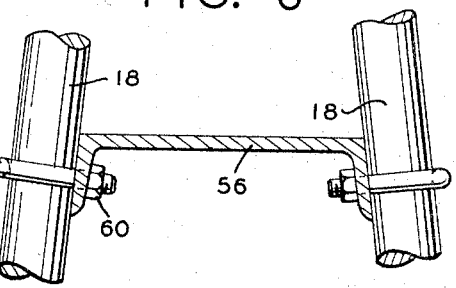
FIGURE 6 is an enlarged partial elevational view of the bracing means for the spokes of the present invention taken along the lines 6—6 of FIGURE 1.
Figure 2:
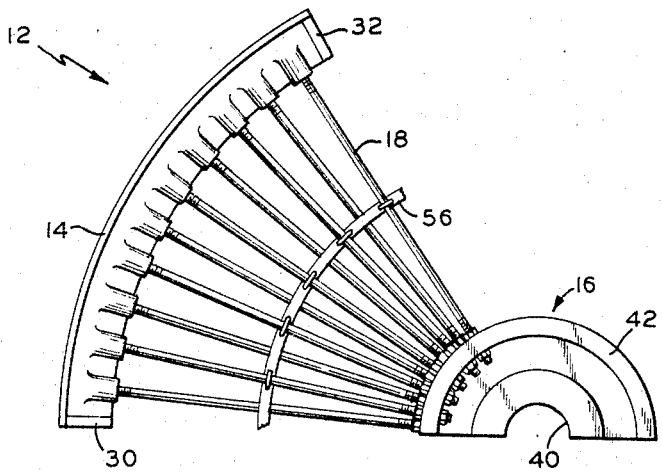
FIGURE 2 is a side elevational view with parts removed of a segment of the head sheave embodying the present invention.

Referring now to FIGURES 2, 4 and 5, a typical rim section will be described in detail. Each rim section 14, when viewed in cross-section, has a generally Y-shaped configuration, with a cable groove 20, a pair of radial extending cable retaining walls 22, 24 and a depending support member 26. A series of threaded sockets 28 are equally spaced about each section to provide the rim housing for the spokes 18. A pair of flanges 30, 32, one on each end of the rim section, has a set of drilled bolt holes 34, 36 to mate with adjacent rim sections when the rim is to be fabricated.

Figure 7:
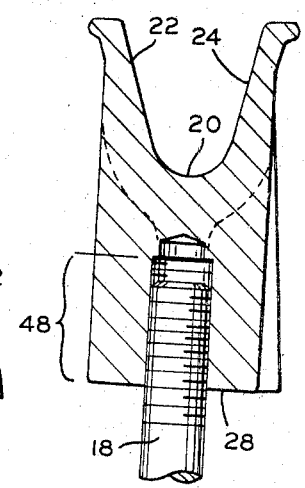
FIGURE 7 is an enlarged sectional view taken along the lines 7—7 of FIGURE 1 showing the interconnection between the rim section and the spokes of the present invention.
Figure 3:
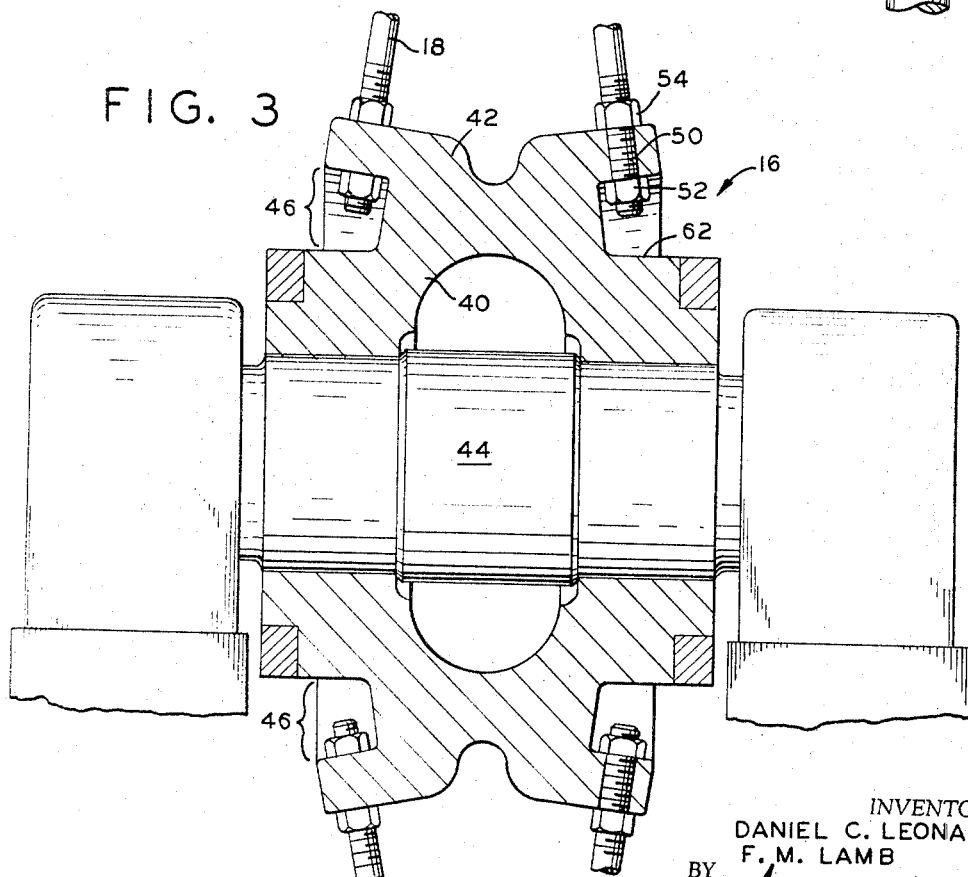
FIGURE 3 is an enlarged view in section of the hub portion of the present invention taken along the line 3—3 of FIGURE 1.

The hub 16 (FIGURE 3), which may be cast as a unit or in sections, is formed of two concentric radially off-set segments, 40 and 42. The first and innermost segment 40 seats the bearing assembly 44, and the second segment 42 provides the housing and support for the spokes 18. The amount of offset or clearance, indicated by reference numeral 46, between the two hub segments 40 and 42 is of critical importance, as will be explained in greater detail below, in the fabrication of the sheave and the replacement of an entire section or an individual spoke. The amount of clearance must be at least equal to the depth 48 (FIGURE 7) of the spokes in the sockets 28 on the rim sections.

The outermost segment 42 of the hub has a series of radial holes 50 drilled completely through to provide the housing for the spokes 18. A pair of nuts 52, 54 one on either side of the housing are used to apply tension to the spokes and to provide a secure attachment between the spoke and the housing. The spokes 18 are threaded on both ends and are sized to pass easily into and out of the rim and hub housings. An annular brace 56, secured to the spokes by U-shaped clamps 58 and nuts 60, may be positioned midway between the rim and the hub when the sheave is fabricated to strengthen the sheave and provide any additional support needed to the rim.

*Fabrication*

The individual rim sections 14, are brought into mating alignment, blocked, and then bolted together in an approximately normal position at abutting flanges 30 and 32. The hub 16 is then positioned and blocked, and the spokes 18 as will now be explained, are individually connected between the rim and the hub. Each spoke is first passed through radial opening 50 in segment 42 of the hub 16 in a plane tangential to the plane of the rim until it abuts against the outer face 62 of inner segment 40. Since the clearance 46, as explained above, is at least equal to the thread length of the spoke sockets 28 on the rim and thus the depth which the spoke will penetrate into the rim, the spoke can be freely moved transversely into the plane of the rim to underlie the sockets 28. The spoke can then be threaded into the socket and nuts 52 and 54 on both sides of the housing tightened to lock the spoke in position. After all the spokes are in place the sheave can be lifted to the vertical position for trueing and tension can be placed on the spokes by further tightening of nuts 52 and 54. If desired an annular brace 56 can then be placed in position by clamps 58 and nuts 60 to provide any additional support needed by the sheave.

Should it become necessary to replace an individual spoke the procedure is the reverse of the above. Nuts 52 and 54 are loosened and the spoke unthreaded from rim socket 28. The spoke is then moved radially through opening 50 until it abuts against outer face 62 of inner segment 40. The spoke can then be moved transversely out of the plane of the rim and removed from the sheave. If an entire rim section becomes worn and needs replacing the spokes can be disconnected in the above manner and the bolts removed from the flage connections 30 and 32. The worn rim section can then be lifted out of position and a new one inserted without disturbing any other part of the sheave, and without removing the sheave from its foundation.

As this invention may be embodied in several forms without departing from the spirit or essential character thereof, the present embodiment is illustrative and not restrictive. The scope of the invention is defined by the appended claims rather than by the description preceding them, and all embodiments which fall within the meaning and range of equivalency of the claims are therefore intended to be embraced by those claims.

We claim:

1. A large diameter head sheave having a rim, a hub, and a plurality of radial spokes therebetween characterized by a plurality of radial spoke-receiving sockets in the rim; the hub having interconnected first and second annular segments; the second annular segment being radially offset outwardly from the first annular segment with an annular clearance space therebetween; said clearance space having a radial dimension at least equal to the penetration of the spokes in the rim sockets; the second annular segment having a plurality of radial spoke-receiving bores therethrough; the spokes having an overall length no greater than the sum of the radial dimensions of the clearance space, the bores in the second segment, and the space between the second segment and the rim sockets; and means for securing the spokes in the rim sockets and hub bores.

2. A large diameter head sheave as defined in claim 1 wherein said rim comprises a plurality of individual sections and means to join said rim sections into a unitary structure.

3. A large diameter head sheave as defined in claim 2 wherein said last mentioned means comprises a flange on both ends of each said rim section, and means to join abutting flanges to form the unitary rim structure.

References Cited

UNITED STATES PATENTS

| | | | |
|---|---|---|---|
| 192,562 | 7/1877 | Bushnell | 74—230.4 |
| 449,322 | 3/1891 | Harris et al. | 74—230.4 |
| 1,135,060 | 4/1915 | Shafer | 74—230.4 |

FRED C. MATTERN, Jr., *Primary Examiner.*

JAMES A. WONG, *Assistant Examiner.*

U.S. Cl. X.R.

74—230.4